United States Patent
Kim et al.

(10) Patent No.: US 10,009,417 B2
(45) Date of Patent: Jun. 26, 2018

(54) METHOD AND APPARATUS FOR WIRELESS GRID COMPU TING

(71) Applicant: SAMSUNG ELECTRONICS CO., LTD., Suwon-si (KR)

(72) Inventors: Sungjin Kim, Suwon-si (KR); Jinhan Kim, Seoul (KR); Sang-Moon Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 12 days.

(21) Appl. No.: 14/851,756

(22) Filed: Sep. 11, 2015

(65) Prior Publication Data
US 2016/0119937 A1    Apr. 28, 2016

(30) Foreign Application Priority Data
Oct. 24, 2014  (KR) .......................... 10-2014-0145514

(51) Int. Cl.
*H04W 72/08* (2009.01)
*H04W 72/12* (2009.01)
*H04L 29/08* (2006.01)
*H04W 40/12* (2009.01)
*H04W 4/00* (2018.01)

(52) U.S. Cl.
CPC ............. *H04L 67/10* (2013.01); *H04W 4/003* (2013.01); *H04W 40/12* (2013.01)

(58) Field of Classification Search
CPC . H04W 4/003; H04W 40/12; H04W 72/0413; H04W 72/048; H04W 72/085; H04W 72/08; H04W 4/00; H04W 72/04; H04L 1/20; H04L 29/08; H04L 67/10
See application file for complete search history.

(56) References Cited

U.S. PATENT DOCUMENTS

| | | | |
|---|---|---|---|
| 6,782,537 B1 | 8/2004 | Blackmore et al. | |
| 7,515,899 B1 | 4/2009 | Carr et al. | |

(Continued)

FOREIGN PATENT DOCUMENTS

| | | |
|---|---|---|
| JP | 2004302741 | 10/2004 |
| JP | 2005070897 | 3/2005 |

(Continued)

OTHER PUBLICATIONS

"Smartphone grids—the future for distributed computing?", Posted on Sep. 17, 2012. pp. 1-2, Retrieved from the internet Aug. 31, 2015, <URL:https://astrocompute.wordpress.com/2012/09/17/smartphone-grids-the-future-for . . . >.

*Primary Examiner* — Khawar Iqbal
(74) *Attorney, Agent, or Firm* — Cantor Colburn LLP

(57) ABSTRACT

A method for wireless grid computing includes: receiving feedback of a computing resource state ("CRS") and channel quality information ("CQI") from at least one candidate terminal; determining at least one parallel work execution terminal to execute the wireless grid computing among at least one terminal based on the feedback of the CRS and the feedback of the CQI; and assigning parallel processing work of the wireless grid computing to the at least one parallel work execution terminal. Such wireless grid computing method may be performed using a base station or a terminal.

29 Claims, 7 Drawing Sheets

(56) References Cited

U.S. PATENT DOCUMENTS

| | | |
|---|---|---|
| 7,885,969 B2 | 2/2011 | Natarajan et al. |
| 8,321,870 B2 | 11/2012 | Messier et al. |
| 8,352,724 B2 | 1/2013 | Miyanaga |
| 8,843,614 B2 | 9/2014 | Yoon et al. |
| 8,942,715 B2 | 1/2015 | Ahmadi |
| 2009/0327164 A1 | 12/2009 | Saito et al. |
| 2010/0281095 A1 | 11/2010 | Wehner et al. |
| 2010/0286824 A1* | 11/2010 | Solomon ................ F41H 13/00 700/248 |
| 2011/0041136 A1 | 2/2011 | Messier et al. |
| 2011/0153812 A1 | 6/2011 | Yoon et al. |
| 2012/0246322 A1 | 9/2012 | Patil et al. |
| 2012/0324245 A1 | 12/2012 | Sinha et al. |
| 2013/0179486 A1 | 7/2013 | Lee et al. |
| 2013/0346468 A2 | 12/2013 | Lee et al. |
| 2014/0038654 A1 | 2/2014 | Ahmadi |
| 2015/0120942 A1 | 4/2015 | Ahmadi |
| 2015/0222414 A1* | 8/2015 | Tabet ................... H04L 7/0016 370/350 |
| 2015/0269225 A1* | 9/2015 | Agrawal ............... G06F 9/5044 707/769 |
| 2015/0305029 A1* | 10/2015 | Rao .......................... H04L 5/22 370/329 |
| 2016/0014810 A1* | 1/2016 | Tabet ................... H04B 7/0626 370/329 |
| 2016/0066357 A1* | 3/2016 | Goldhamer ........... H04W 4/008 455/426.1 |
| 2016/0183323 A1* | 6/2016 | Rahman ............ H04W 74/0833 370/329 |
| 2016/0192333 A1* | 6/2016 | Wang ................... H04L 5/0053 370/329 |
| 2016/0242187 A1* | 8/2016 | Zhang ................... H04L 5/0007 |
| 2016/0285901 A1* | 9/2016 | Oakenfull ......... H04L 29/06102 |
| 2016/0295555 A1* | 10/2016 | Cheng .................. H04W 48/16 |
| 2017/0041971 A1* | 2/2017 | Kim ...................... H04W 72/12 |
| 2017/0064571 A1* | 3/2017 | Kusashima ........... H04W 24/10 |
| 2017/0188371 A1* | 6/2017 | Kim ...................... H04W 24/10 |
| 2017/0195017 A1* | 7/2017 | Kim ..................... H04B 7/0417 |
| 2017/0206184 A9* | 7/2017 | Chen ..................... G06F 17/18 |

FOREIGN PATENT DOCUMENTS

| | | |
|---|---|---|
| JP | 5051220 B2 | 10/2012 |
| KR | 1020070010316 A | 1/2007 |
| KR | 1020110073162 A | 6/2011 |
| KR | 1020130080722 A | 7/2013 |

* cited by examiner

METHOD AND APPARATUS FOR WIRELESS GRID COMPUTING

CROSS-REFERENCE TO RELATED APPLICATION

This application claims priority to Korean Patent Application No. 10-2014-0145514 filed on Oct. 24, 2014, and all the benefits accruing therefrom under 35 U.S.C. § 119, the content of which in its entirety is herein incorporated by reference.

BACKGROUND (a) Field

The invention relates to a method for grid computing that is performed between a base station and a plurality of wireless terminals under a wireless environment, and an apparatus for grid computing.

(b) Description of the Related Art

As computing performance of a mobile terminal is gradually improved, the performance of each mobile terminal approaches performance of a personal computer ("PC"). Further, a transmission capacity of wireless communication has been gradually increased between mobile terminals and between a mobile terminal and an access point ("AP"). Millimeter wave technology and multiple antenna beamforming technology, which have been recently researched, improve the performance of the wireless communication to the performance of wired communication or more.

The mobile terminal may perform wireless grid computing based on a message passing interface ("MPI") through wireless networking with a neighboring terminal. When a physical cable for wired grid computing is removed as a result of the wireless grid computing, a spatial limitation caused by the cable and a connection complexity problem among n nodes may be overcome.

In a general supercomputer architecture (e.g., a cluster-type architecture constituted by a plurality of nodes), original work is divided into a plurality of tasks and which are assigned to the plurality of nodes. Thereafter, when results of the divided tasks performed by the respective nodes are finally aggregated, the original work may be ended. In this case, the original work may be a result of the division operation by homogeneous nodes or a result of the division operation by heterogeneous nodes. A purpose for providing the plurality of homogeneous nodes is to perform an original work using many workable nodes. A purpose for providing the plurality of heterogeneous nodes is to perform an original work using particular work resources.

Hardware resources of a node of a supercomputer may be classified into calculation, storage, and communication parts, and into general-use resources and special-function resources. Further, each node of the super computer may have software resources.

The calculation resource relates to how fast a process processing unit included in the node operates, e.g., processes a process. The storage resource relates to a capacity of a short-term storage device (for example, a main memory) and a capacity of a long-term storage device (for example, a hard disk) included in the node. The communication resource relates to a transmission speed and a transmission capacity between the respective nodes. The general-use resource means general resources such as the calculation resource, the storage resource, and the communication resource. The special-function resource means a resource such as a graphics processor unit ("GPU") for graphics-related calculation and floating point processing. The software resource means information on whether specific software required for executing the parallel processing work is installed or the number and versions of licenses of each node. By the resources enumerated above, a single work execution speed of each node, a work type, and the like, as well as the number of work stand-by arrays, may be determined.

A wireless network may be used as a physical base element that performs the work of the supercomputer since the wireless network receives a response in a wide range by simultaneously broadcasting a use request to the plurality of nodes and thus easily finds a node which is capable of executing the work. Further, the wireless network may be used to dynamically configure topology, such that the wireless network may effectively use optimal channel resources for the work which is currently performed.

SUMMARY

Exemplary embodiments of the invention provide a method and an apparatus for wireless grid computing, which may execute parallel work between respective terminals or between a terminal and a base station using a wireless network.

An exemplary embodiment of a wireless grid computing method using a base station according to the invention includes: receiving a feedback of a computing resource state ("CRS") and a feedback of channel quality information ("CQI") from a plurality of candidate terminals by the base station; analyzing an execution pattern of software to be executed by the wireless grid computing by the base station; determining at least one work execution terminal to execute the wireless grid computing among the plurality of candidate terminals by the base station based on an analysis result of the execution pattern, the feedback of CRS and the feedback of CQI; and assigning parallel processing work of the wireless grid computing to the at least one work execution terminal by the base station.

In an exemplary embodiment, the determining the at least one work execution terminal may include considering spatial property information ("SPI") of the base station.

In an exemplary embodiment, the assigning may include assigning the parallel processing work to the at least one work execution terminal by forming a beam based on the SPI.

In an exemplary embodiment, the method may further include requesting the feedback of the computing resource state and the feedback of the channel quality information from the plurality of candidate terminals, by the base station.

In an exemplary embodiment, the requesting may include selectively requesting the feedback of the CRS based on the type of the parallel processing work.

In an exemplary embodiment, the method may further include: collecting hardware information and software information of a plurality of terminals by the base station; and selecting the plurality of candidate terminals among the plurality of terminals based on the hardware information and the software information by the base station.

In an exemplary embodiment, the method may further include: receiving the execution result of the parallel processing work from at least one work execution terminal by the base station; and collecting the execution result and determining whether additional work is to be executed, by the base station.

In an exemplary embodiment, the method may further include repeating the receiving the feedback of the computing resource state and the feedback of the channel quality information, the determining the at least one work execution terminal, the assigning, and the receiving the execution result when it is determined that the additional work is to be executed.

In an exemplary embodiment, the determining the at least one work execution terminal may include determining whether a message passing through a wireless link is to be used more than a computing resource of the at least one work execution terminal to execute the wireless grid computing, and determining a candidate terminal having a higher channel quality among the candidate terminals as the at least one work execution terminal when it is determined that the message passing through the wireless link is to be used more than the computing resource of the at least one work execution terminal.

In an exemplary embodiment, the determining the at least one work execution terminal may include determining whether a computing resource of the at least one work execution terminal is to be used more than a message passing through a wireless link to execute the wireless grid computing, and determining a candidate terminal having a higher computer resource among the candidate terminals as the at least one work execution terminal when it is determined that the computing resource of the at least one work execution terminal is to be used more than the message passing through the wireless link.

An exemplary embodiment of a base station executing wireless grid computing according to the invention includes: a receiving unit which receives a feedback of a CRS and a feedback of CQI from a plurality of candidate terminals; a software execution pattern analyzing unit which analyzes an execution pattern of software to be executed by the wireless grid computing; a work execution terminal determining unit which determines at least one work execution terminal to execute the wireless grid computing among the plurality of candidate terminals based on an analysis result of the execution pattern, the feedback of CRS and the feedback of CQI; and a message generating unit which generates an assignment message to assign parallel processing work of the wireless grid computing to the at least one work execution terminal.

In an exemplary embodiment, the work execution terminal determining unit may consider SPI of the base station.

In an exemplary embodiment, the base station may further include a transmitting unit which transmits the assignment message by forming a beam based on the SPI.

In an exemplary embodiment, the message generating unit may generate a feedback request message to request the feedback of CRS and the feedback of CQI from the plurality of candidate terminals.

In an exemplary embodiment, the feedback request message may selectively include a feedback request for the feedback of the CRS based on the type of the parallel processing work.

In an exemplary embodiment, the receiving unit may include a candidate terminal selecting unit which collects hardware information and software information of a plurality of terminals, and selects the plurality of candidate terminals among the plurality of terminals based on the hardware information and the software information.

In an exemplary embodiment, the base station may further include a control unit which receives an execution result of the parallel processing work from the plurality of work execution terminals and collects the execution result to determine whether additional work is to be executed.

In an exemplary embodiment, the control unit may instruct the receiving unit, the work execution terminal determining unit, the message generating unit, and the transmitting unit to perform operations thereof again when it is determined that the additional work is to be executed.

In an exemplary embodiment, the software execution pattern analyzing unit may determine whether a message passing through a wireless link is to be used more than a computing resource of the at least one work execution terminal to execute the wireless grid computing, and the work execution terminal determining unit may determine a terminal having a higher channel quality among the plurality of candidate terminals as the at least one work execution terminal when it is determined that the message passing through the wireless link is to be used more than the computing resource of the at least one work execution terminal.

In an exemplary embodiment, the software execution pattern analyzing unit may determine whether a computing resource of the work execution terminal is to be used more than a message passing through a wireless link to execute the wireless grid computing, and the work execution terminal determining unit may determine a terminal having a higher computing resource among the candidate terminals as the at least one work execution terminal when it is determined that the computing resource of the at least one work execution terminal is to be used more than the message passing through the wireless link.

Another exemplary embodiment of a wireless grid computing method using a base station according to the invention includes: receiving a request for wireless grid computing from a terminal and relaying the request to at least one candidate terminal by the base station; receiving a feedback of a CRS and a feedback of CQI from the at least one candidate terminal; determining at least one work execution terminal to execute the wireless grid computing among the at least one candidate terminal based on the feedback of the CRS and the feedback of the CQI; and transferring a list of the at least one work execution terminal from the base station to the terminal.

In an exemplary embodiment, the request for the wireless grid computing may include feedback requests for the feedback of the CRS and the feedback of the CQI.

In an exemplary embodiment, the method may further include: receiving the parallel processing work assigned based on the list of the at least one work execution terminals from the terminal and relaying the parallel processing work to the at least one work execution terminal by the base station; and receiving an execution result of the parallel processing work from the at least one work execution terminal and relaying the execution result to the terminal by the base station.

In an exemplary embodiment, the determining the at least one work execution terminal may include considering SPI of the base station.

An exemplary embodiment of a wireless grid computing method using a terminal according to the invention is provided. The method includes: receiving a feedback of a CRS and a feedback of CQI from at least one candidate terminal; analyzing an execution pattern of software to be executed by the wireless grid computing; determining at least one work execution terminal to execute the wireless grid computing among the at least one candidate terminal based on an analysis result of the execution pattern, the feedback of the CRS and the feedback of the CQI; and assigning parallel processing work of the wireless grid computing to the at least one work execution terminal.

In an exemplary embodiment, the determining the at least one work execution terminal may include considering SPI of the terminal.

In an exemplary embodiment, the assigning may include assigning the parallel processing work to the at least one work execution terminal by forming a beam based on the SPI.

In an exemplary embodiment, the method may further include: collecting hardware information and software information of a plurality of terminals by the terminal; and selecting the at least one candidate terminal among the plurality of terminals based on the hardware information and the software information by the terminal.

In an exemplary embodiment, the method may further include requesting the feedback of the CRS and the feedback of the CQI from the at least one candidate terminal by the terminal.

In an exemplary embodiment, the requesting may include selectively requesting the feedback of the CRS based on the type of the parallel processing work.

In an exemplary embodiment, the method may further include: receiving the execution result of the parallel processing work from the at least one work execution terminal by the terminal; and collecting the execution result and determining whether additional work is to be executed by the terminal.

In an exemplary embodiment, the method may further include repeating the receiving the feedback of the computing resource state and the feedback of the channel quality information, the determining the at least one work execution terminal, the assigning, and the receiving the execution result when it is determined that the additional work is to be executed.

In an exemplary embodiment, the determining the at least one work execution terminal may include determining whether a message passing through a wireless link is to be more used than a computing resource of the at least one work execution terminal to execute the wireless grid computing, and determining a candidate terminal having a higher connection quality among the at least one candidate terminal as the at least one work execution terminal when it is determined that the message passing through the wireless link is to be used more than the computing resource of the at least one work execution terminal.

In an exemplary embodiment, the determining the at least one work execution terminal may include determining whether a computing resource of the at least one work execution terminal is to be more used than a message passing through a wireless link to execute the wireless grid computing, and determining a candidate terminal having a higher computer resource among the at least one candidate terminal as the at least one work execution terminal when it is determined that the computing resource of the work execution terminal is to be used more than the message passing through the wireless link.

An exemplary embodiment of an apparatus for executing wireless grid computing according to the invention includes: at least one processor; a memory; and at least one program stored in the memory and executed by the at least one processor, where the at least one program includes a command to receive a feedback of a CRS and a feedback of CQI from a plurality of candidate terminals, a command to analyze an execution pattern of software to be executed by the wireless grid computing, a command to determine at least one work execution terminal to execute the wireless grid computing among the plurality of candidate terminals based on an analysis result of the execution pattern, the feedback of the CRS and the feedback of the CQI, and a command to assign parallel processing work of the wireless grid computing to the at least one work execution terminal.

According to exemplary embodiments of the invention, CRS and CQI information of each terminal is shared by a terminal or a base station to determined work execution terminals for performing wireless grid computing in real time such that the wireless grid computing may be substantially effectively performed.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
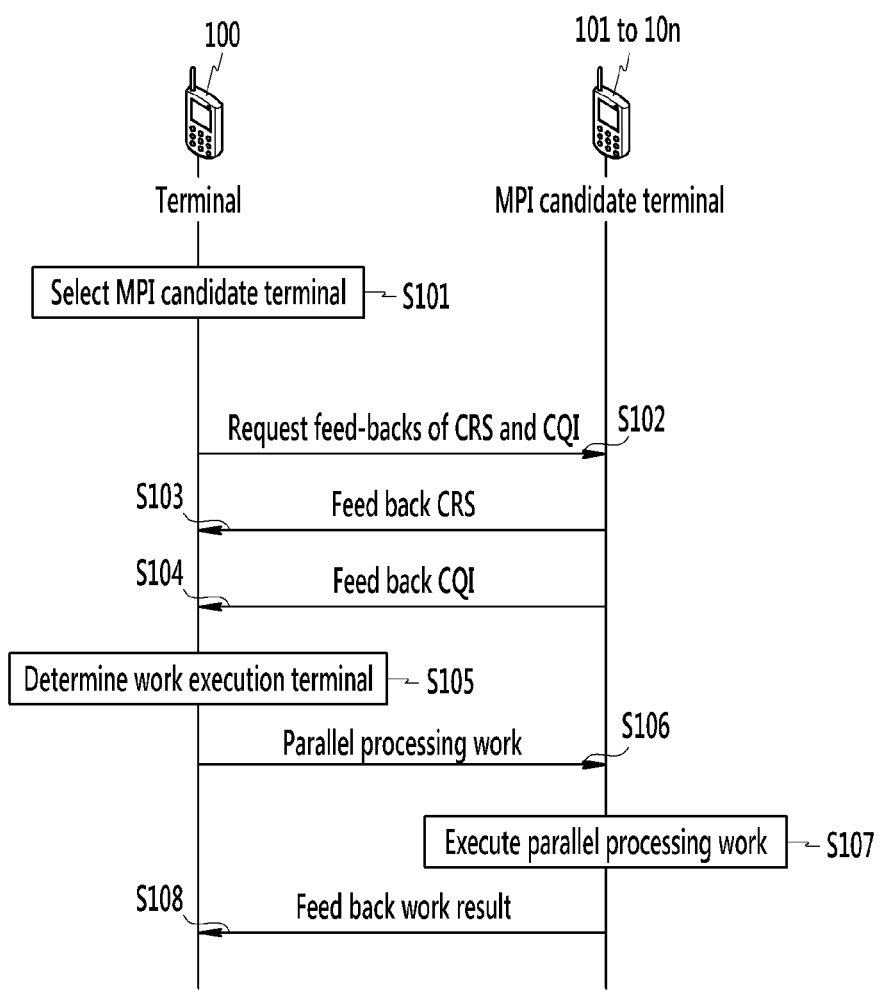
FIG. 1 is a flowchart illustrating an exemplary embodiment of an inter-terminal grid computing method according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Herein, a terminal may be designated as a mobile station ("MS"), a mobile terminal ("MT"), an advanced mobile station ("AMS"), a high reliability mobile station ("HR-MS"), a subscriber station ("SS"), a portable subscriber station ("PSS"), an access terminal ("AT"), user equipment ("UE") and the like, for example, and may include all or some functions of the MT, the MS, the AMS, the HR-MS, the SS, the PSS, the AT, the UE and the like.

Herein, a base station ("BS") may be designated as an advanced base station ("ABS"), a high reliability base station ("HR-BS"), a node B ("NodeB"), an evolved node B ("eNodeB"), an access point ("AP"), a radio access station ("RAS"), a base transceiver station ("BTS"), a mobile multihop relay ("MMR")-BS, a relay station ("RS") serving as the base station, a relay node (RN) serving as the base station, an advanced relay station ("ARS") serving as the base station, a high reliability relay station ("HR-RS") serving as the base station, small-sized base stations, e.g., femto BS, a home node B ("HNB"), a home eNodeB ("HeNB"), a pico BS, A metro BS and a micro BS] and the like, and may include all or some functions of the ABS, the NodeB, the eNodeB, the AP, the RAS, the BTS, the MMR-BS, the RS, the RN, the ARS, the HR-RS, the small-sized base stations and the like.

An exemplary embodiment of the mobile terminal according to the invention may perform wireless grid computing based on a message passing interface ("MPI") through wireless networking with a neighboring mobile terminal. In such an embodiment, message transferring is used to share a calculation result, and an availability of the wireless grid computing (e.g., whether the wireless grid computing is available) may be determined based on channel quality information ("CQI") regarding a wireless channel state between terminals and a computing resource state ("CRS") of a counterpart terminal. When the CRS of the counterpart terminal slightly remains or the CQI between the terminals is inferior, an effect of the wireless grid computing based on the message transferring may be reduced and damage may occur in a whole system due to overhead.

In an exemplary embodiment of the invention, the mobile terminal may be a terminal in which a wireless channel is changed from moment to moment with movement, and the mobile terminal may be a nomadic terminal. In such an embodiment, unlike a fixed wireless device, the CQI of the mobile terminal may be continuously verified due to positional variation of the terminal, and the CRS of the mobile terminal may be further considered. Hardware resources and software resources that may contribute to the wireless grid computing may be different from each other in respective mobile terminals and a resource situation may also be changed with time, and as a result, the CRS is also considered in such an embodiment.

According to an exemplary embodiment of the invention, where such a mobile terminal participates in the wireless grid computing in the MPI scheme, as the number of wireless terminals that participate in the grid computing increases, the number of wireless paths used for message passing also increases. Therefore, interference between wireless paths in which the message is passed may occur. In an exemplary embodiment of the invention, wireless beamforming technology or a clustering technique may be used to effectively prevent or substantially minimize the interference.

Interference at the time of transmitting the message to the neighboring mobile terminal may be minimized through the wireless beamforming. That is, the beamforming technology using multiple antennas may minimize the interference through a beam when wireless connection with a plurality of terminals is formed. As an overlapping region of a transmission beam decrease, the interference may be minimized. Since the width of the beam is typically in inverse proportion to the number of antennas, when more antennas are used, a narrower beam may be formed and the narrower beam may further reduce the interference. To further decrease the overlapping region of the transmission beam, inter-signal interference may be reduced even through spatial processing of a signal transmitted in an antenna array. In an exemplary embodiment, spatial processing for the signal is used under an interior environment having a lot of scattering elements, such that the inter-signal interference may be significantly controlled. In an exemplary embodiment, where a millimeter wave is used for communication using a wide bandwidth, various matrix types of antenna groups may be installed, such that an effect of the mobile grid computing based on the interference removal through the beamforming may be maximized.

In an exemplary embodiment, in a terminal group in which message passing is frequent, interference between messages which are frequently passed may be minimized by clustering terminals having high mutual-orthogonality.

Hereinafter, exemplary embodiments of the invention will be described in further detail with reference to the accompanying drawings.

FIG. 1 is a flowchart illustrating an exemplary embodiment of an inter-terminal grid computing method according to the invention.

The inter-terminal grid computing may be performed by using inter-terminal direct communication in an exemplary embodiment of the invention as illustrated in FIG. 1.

Referring to FIG. 1, in an exemplary embodiment, a terminal 100 selects MPI candidate terminals 101 to 10$n$ among a plurality of terminals positioned in a vicinity thereof (S101), and requests a feedback of the CRS (i.e., a CRS feedback) or a feedback of the CQI (i.e., a CQI feedback) to the selected MPI candidate terminals 101 to 10$n$ (S102). In an exemplary embodiment of the invention, the MPI candidate terminals 101 to 10$n$ indicate candidate terminals for selecting a terminal that is to perform wireless grid computing (e.g., parallel processing work of the wireless grid computing) with the terminal 100, and a plurality of MPI candidate terminals may be selected. In such an embodiment, the terminal 100 selects the type of CRS based on the type of the parallel processing work of the wireless grid computing to request the selected CRS type from the MPI candidate terminals 101 to 10$n$. In one exemplary embodiment, for example, the parallel processing work may be executed using a processing capability of a processor of the selected MPI candidate terminals 101 to 10n, the terminal 100 may request the CRS regarding the performance of a CPU or a GPU from the selected MPI candidate terminals 101 to 10n, and when the parallel processing work may be executed using a multiple-processing capability of the selected MPI candidate terminals 101 to 10n, the terminal 100 may request the CRS regarding a memory capacity from the selected MPI candidate terminals 101 to 10n.

The MPI candidate terminals 101 to 10n feed back the CRS and the CQI to the terminal 100 (S103 and S104) in response to the request for the CRS feedback and the CQI feedback from the terminal 100. In an exemplary embodiment, the CRS may include a CRS of hardware or a CRS of software.

Thereafter, the terminal 100 determines an optimal work execution terminal based on the CRS feedback and the CQI feedback received from the MPI candidate terminals 101 to 10n (S105). In an exemplary embodiment, the terminal 100 may consider spatial property information ("SPI") of the terminal 100, and at least one work execution terminal may be determined. In an exemplary embodiment, the terminal may grant weighted values to the CRS feedback and the CQI feedback by analyzing an execution pattern of the software in determining the work execution terminal. In such an embodiment, when the execution pattern of the software to be executed by the wireless grid computing uses more message passing than computing resource, the terminal 100 may grant a larger weighted value to the CQI feedback to select a terminal having a higher channel quality as the work execution terminal. In such an embodiment, when the execution pattern of the software to be executed by the wireless grid computing uses more computing resources than message passing, the terminal 100 may grant a larger weighted value to the CRS feedback to select a terminal having a higher computing resource as the work execution terminal. Herein, whether the execution pattern of the software is to use more message passing than computing resources or more computing resources than message passing may be determined based on a predetermined algorithm.

In an exemplary embodiment, the terminal 100 transfers the parallel processing work to the determined work execution terminal (S106). The work execution terminal that receives the parallel processing work performs the parallel processing work using a computing resource thereof (S107), and then transfers a work execution result to the terminal 100 (S108). Thereafter, the terminal 100 may complete the parallel processing work by the work execution terminal.

Figure 2:
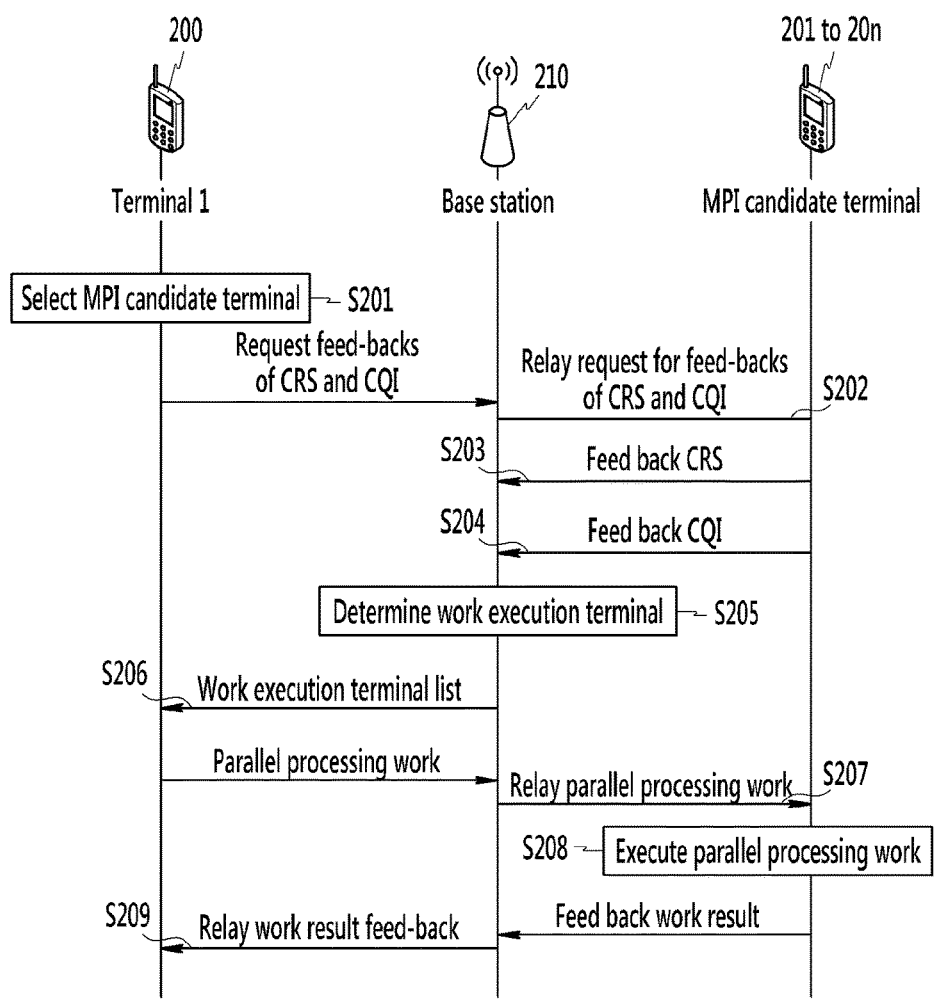
FIG. 2 is a flowchart illustrating an alternative exemplary embodiment of an inter-terminal grid computing method according to the invention.

FIG. 2 is a flowchart illustrating an alternative exemplary embodiment of an inter-terminal grid computing method according to the invention.

The inter-terminal grid computing may be performed by using a base station 210 (e.g., an AP) in another exemplary embodiment of the invention as illustrated in FIG. 2.

Referring to FIG. 2, in an exemplary embodiment, a terminal 200 selects MPI candidate terminals 201 to 20n (S201). Thereafter, CRS feedback and CQI feedback requests from the terminal 200 to the MPI candidate terminals 201 to 20n may be transferred to the MPI candidate terminals 201 to 20n through a relay of the base station 210 (S202). In such an embodiment, the base station 210 may receive a wireless grid computing request including the CRS feedback and the CQI feedback requests from the terminal 200 and relay the wireless grid computing request to the MPI candidate terminals 201 to 20n selected by the terminal 200. In such an embodiment, where the base station 210 relays the CRS feedback and the CQI feedback, the MPI candidate terminals 201 to 20n may be terminals positioned within coverage of the base station 210. In such an embodiment, the terminal 200 selects the type of CRS based on the type of parallel processing work to request the selected CRS type from the MPI candidate terminals 201 to 20n.

Thereafter, the MPI candidate terminals 201 to 20n that receive the request for the CRS feedback and the CQI feedback transfer the CRS feedback and the CQI feedback to the base station 210 (S203 and S204), and the base station 210 determines an optimal work execution terminal among the MPI candidate terminals 201 to 20n based on the received CRS feedback and CQI feedback (S205). In such an embodiment, the base station 210 may further consider spatial property information ("SPI") of the base station 210.

Thereafter, the base station 210 transfers a list of the determined work execution terminals (also referred to as "determined terminal list") to the terminal 200 (S206), and the terminal 200 transfers the parallel processing work to the base station 210 by determining the parallel processing work based on the determined terminal list (S207). The base station 210 relays the parallel processing work received from the terminal 200 to the determined work execution terminal. A grid computing target terminal that receives the parallel processing work through the relay by the base station 210 performs the parallel processing work using a computing resource thereof (S208), then transfers a result of executing the parallel processing work to the base station 210, and the base station 210 relays the result of executing the parallel processing work to the terminal 200 (S209). Thereafter, the terminal 200 may complete the parallel processing work by a plurality of work execution terminals.

In an exemplary embodiment, the terminal may include a processor, a memory and a program stored in the memory and executed by the processor. In such an embodiment, the program in the terminal may include a command regarding the selection of the MPI candidate terminals, a command to request the CRS and CQI feedback, a command associated with the determination of the work execution terminals, a command regarding distribution of the parallel processing work and a command associated with a function to determine the completion of the parallel processing work, for example. The processor executes various programs or command sets stored in the memory to execute various functions for the terminal and to process data. The memory may include a high-speed random access memory ("RAM"), a non-volatile memory such as a magnetic disk storage device, a flash memory device, or other solid state memory ("SSD"), for example. Access to the memory by another component of the terminal, such as the processor, may be controlled by a memory controller (not illustrated).

Figure 3:
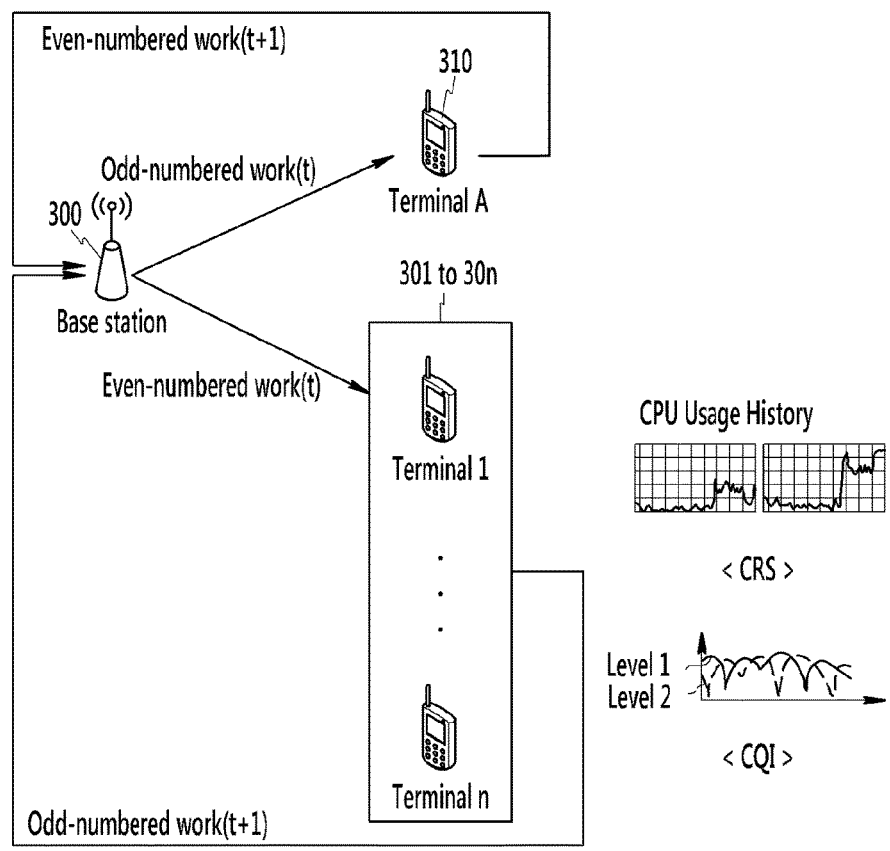
FIG. 3 is a diagram illustrating an exemplary embodiment of a grid computing method using a base station according to the invention.

FIG. 3 is a diagram illustrating an exemplary embodiment of a grid computing method using a base station according to the invention.

In an exemplary embodiment, as shown in FIG. 3, a method of performing grid computing by the base station may be performed based on an Ising model. In statistical dynamics, the Ising model is a simple model of a ferromagnetic body and an anti-ferromagnetic body. In an exemplary embodiment of the grid computing according to the invention, even-numbered areas and odd-numbered areas are calculated in parallel based on the Ising model, respectively. In one exemplary embodiment, for example, the base station allocates odd-numbered work to a first terminal at a time t and allocates even-numbered work to a second terminal at the time t. Thereafter, the base station receives even-numbered work feedback from the first terminal at a time t+1 and receives odd-numbered work feedback from the second terminal at a time t+2. In the related art, when the base station allocates the odd-numbered work and the even-numbered work to the first terminal and the second terminal, respectively, the base station may not consider a channel state of each terminal or a CRS of each terminal.

In an exemplary embodiment of the invention, when the base station allocates the odd-numbered work and the even-numbered work to each terminal, the base station may select a work execution terminal based on the CRS and the CQI of each terminal among a plurality of terminals to execute the odd-numbered work or the even-numbered work.

Referring to FIG. 3, when a base station 300 selects a terminal to which the even-numbered work is allocated at the time t, the base station 300 receives the CRS feedback and the CQI feedback of terminal 1 to terminal 301 to 30$n$ (that is, a first to n-th terminals of the MPI candidate terminals), respectively, and selects a terminal to which the even-numbered work is allocated based on the CRS feedback and the CQI feedback of each terminal. In such an embodiment, the terminal which the odd-numbered works is allocated at the time t may be terminal A 310 as shown in FIG. 3. Thereafter, the base station 300 may receive the even-numbered work feedback from the terminal A 310 at the time t+1, and receive the odd-numbered work feedback from the terminal selected from the terminal 1 to the terminal 301 to 30$n$.

Figure 4:
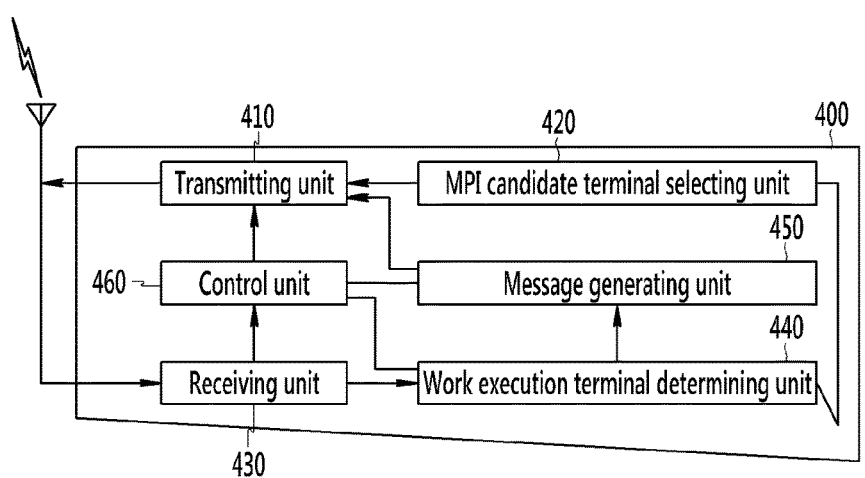
FIG. 4 is a block diagram illustrating an exemplary embodiment of a base station according to the invention.

FIG. 4 is a block diagram illustrating an exemplary embodiment of a base station according to the invention.

Referring to FIG. 4, an exemplary embodiment of a base station 400 according to the invention includes a transmitting unit 410, an MPI candidate terminal selecting unit 420, a receiving unit 430, a work execution terminal determining unit 440, a message generating unit 450, and a control unit 460. Herein, the units of the base station 400 may include a device, a circuit, a processor or a portion thereof, designed to perform functions thereof as described below.

The transmitting unit 410 may transmit a feedback request message for requesting the feedback of the CRS and the CQI to the MPI candidate terminal, and a work instruction (e.g., an allocation message for the parallel processing work) for a parallel processing work to the work execution terminal. In an exemplary embodiment, the transmitting unit 410 may transmit the feedback request message or the allocation message to the MPI candidate terminal through a beam-forming technique, for example.

The MPI candidate terminal selecting unit 420 may determine the MPI candidate terminals and transfer a list of the determined MPI candidate terminals to the transmitting unit 410.

The receiving unit 430 may receive the CRS feedback and the CQI feedback from the MPI candidate terminal and transfer the received CRS and CQI feedbacks to the work execution terminal determining unit 440. In such an embodiment, the receiving unit 430 may receive a result feedback for the parallel processing work instruction from the work execution terminal and transfer the received result feedback to the control unit 460.

The work execution terminal determining unit 440 may determine the work execution terminal among the MPI candidate terminal based on the CRS feedback and the CQI feedback received from the MPI candidate terminal. The work execution terminal determining unit 440 may consider an SPI of the base station 400.

The message generating unit 450 may generate a request message for the CRS feedback and the CQI feedback to be transmitted to the MPI candidate terminal. In an exemplary embodiment, the message generating unit 450 may selectively request a CRS determined based on a type of parallel processing work. In such an embodiment, the message generating unit 450 may determine the parallel processing work to be assigned to each determined work execution terminal and generate the work instruction for the determined parallel processing work.

The control unit 460 collects a result feedback for the work instruction of each work execution terminal based on the determined parallel processing work determined by the message generating unit 450. In such an embodiment, the control unit 460 determines whether additional work is to be further executed and when the additional work is to be executed, and instructs the additional work to the transmitting unit 410 to allow the receiving unit 430 to receive the feedbacks of the CRS and the CQI from the MPI candidate terminal again.

Figure 5:
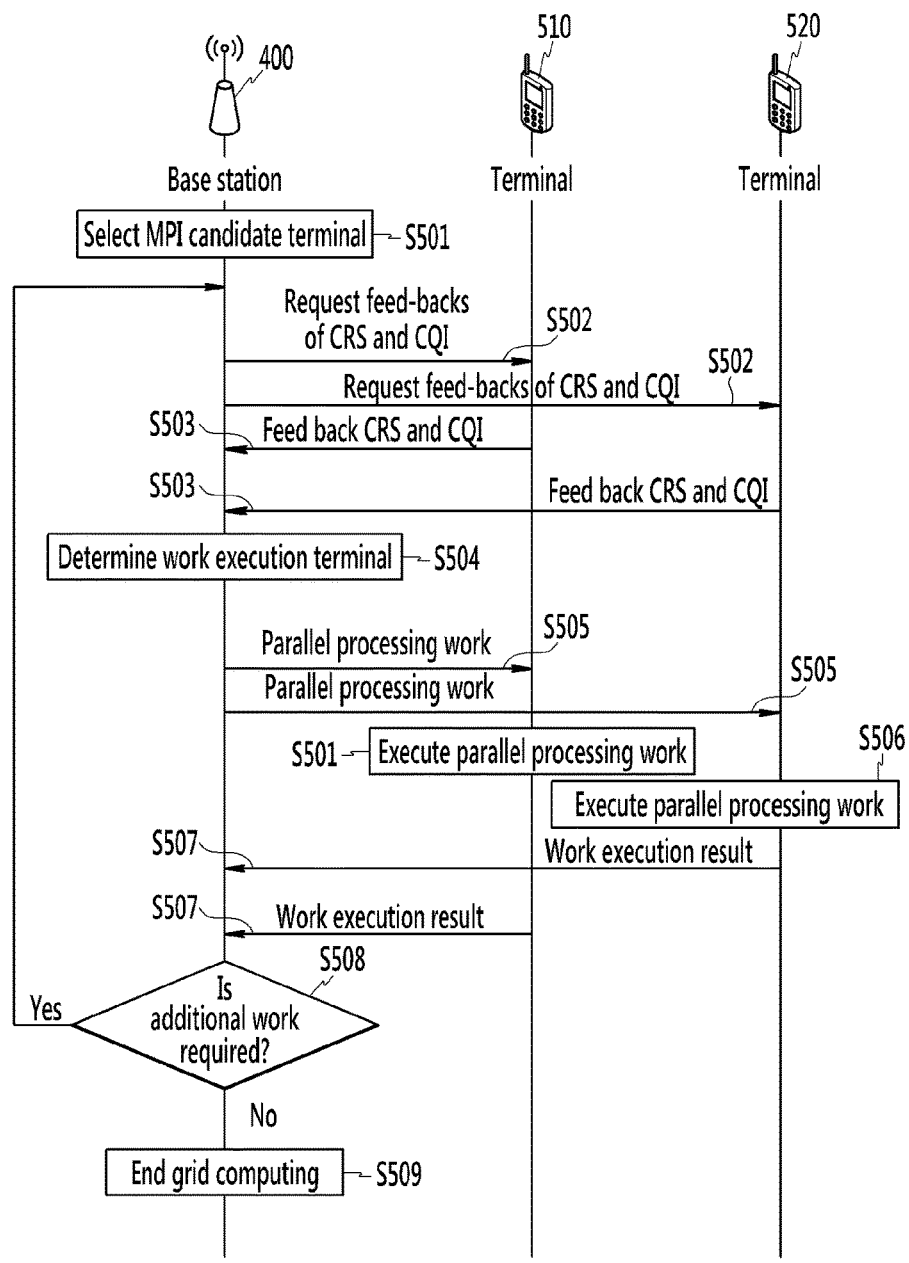
FIG. 5 is a flowchart illustrating an alternative exemplary embodiment of a grid computing method using a base station according to the invention.

FIG. 5 is a flowchart illustrating an alternative exemplary embodiment of a grid computing method using a base station according to the invention.

In an exemplary embodiment, referring to FIGS. 4 and 5, the MPI candidate terminal selecting unit 420 of the base station 400 selects the MPI candidate terminals (S501) and transfers the list of the selected MPI candidate terminals to the transmitting unit 410. The transmitting unit 410 requests the feedback of the CRS and the CQI from the terminal included in the list of the MPI candidate terminals (S502). Thereafter, a MPI candidate terminal (e.g., at least one MPI candidate terminal) transmits the CRS feedback and the CQI feedback to the base station 400 (S503), and the work execution terminal determining unit 440 determines at least one work execution terminal 510 and 520 among the MPI candidate terminals according to an advance rule based on the received CRS feedback and CQI feedback (S504). In such an embodiment, the work execution terminal determining unit 440 may consider an SPI of the base station 400.

Thereafter, the message generating unit 450 determines the parallel processing work to be allocated to one or more determined work execution terminals 510 and 520, respectively, and generates a work instruction for the determined parallel processing work to transmit the generated work instruction to each work execution terminal 510 or 520 (S505). Each of the work execution terminals 510 and 520 receiving the work instruction executes the allocated parallel processing work (S506) and transmits the execution result to the base station 400 (S507).

The base station 400 receives the execution result for the parallel processing work from each work execution terminal 510 or 520, and the control unit 460 of the base station 400 collects the execution results to determine whether additional work is to be executed (S508). When it is determined that the additional work is to be executed, the control unit 460 sends requests of the CRS feedback and the CQI feedback for the MPI candidate terminal to the message generating unit 450. Thereafter, the transmitting unit 410 retransmits a re-request message of the CRS feedback and the CQI feedback generated from the message generating unit 450 to the MPI candidate terminal, and as a result, the additional work may be executed. When it is determined that the additional work is not to be executed, the base station 400 ends wireless grid computing (S509).

Figure 6:
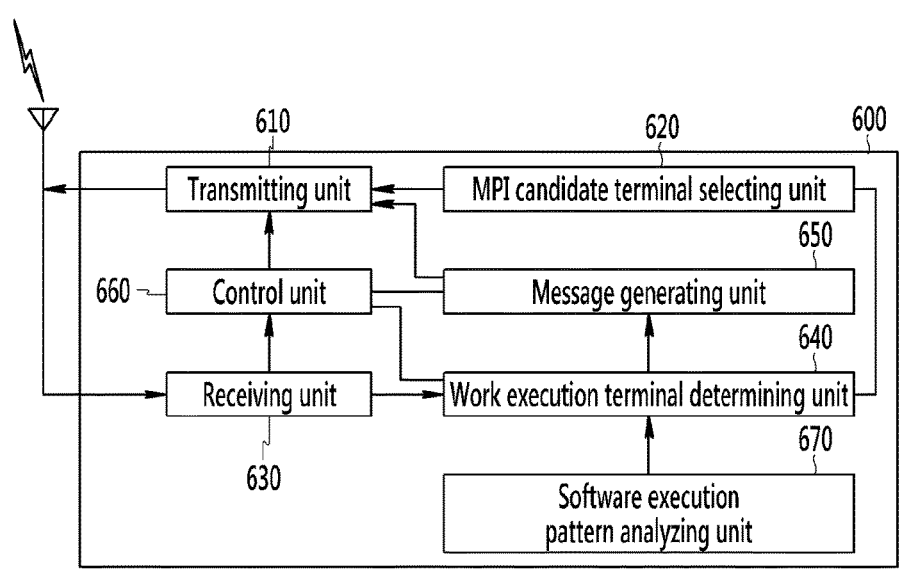
FIG. 6 is a block diagram illustrating an alternative exemplary embodiment of a base station according to the invention.

FIG. 6 is a block diagram illustrating an alternative exemplary embodiment of a base station according to the invention.

Referring to FIG. 6, an exemplary embodiment of a base station 600 according to the invention includes a transmitting unit 610, an MPI candidate terminal selecting unit 620, a receiving unit 630, a work execution terminal determining unit 640, a message generating unit 650, a control unit 660, and a software execution pattern analyzing unit 670. In such an embodiment, the base station may further include the software execution pattern analyzing unit 670 as illustrated in FIG. 6.

In an exemplary embodiment, as shown in FIG. 6, the software execution pattern analyzing unit 670 may give a weighted value to the CRS feedback and the CQI feedback when determining the work execution terminal. In such an embodiment, when the execution pattern of the software to be executed by the wireless grid computing frequently uses a lot of message passing, a terminal having a better (e.g., higher) channel quality may be selected based on the CQI thereof as the work execution terminal by giving a larger weighted value to the CQI feedback. In such an embodiment, when the execution pattern of the software uses many computing resources, a terminal having a better (e.g., larger) computing resource may be selected based on the CRS thereof as the work execution terminal by giving a larger weighted value to the CRS feedback. In such an embodiment, the software execution pattern analyzing unit 670 may be included in the work execution terminal determining unit 640 that determines the work execution terminal based on the CRS feedback and the CQI feedback. In an alternative exemplary embodiment, the software execution pattern analyzing unit 670 may be connected with the work execution terminal determining unit 640 as a separate processor.

Figure 7:
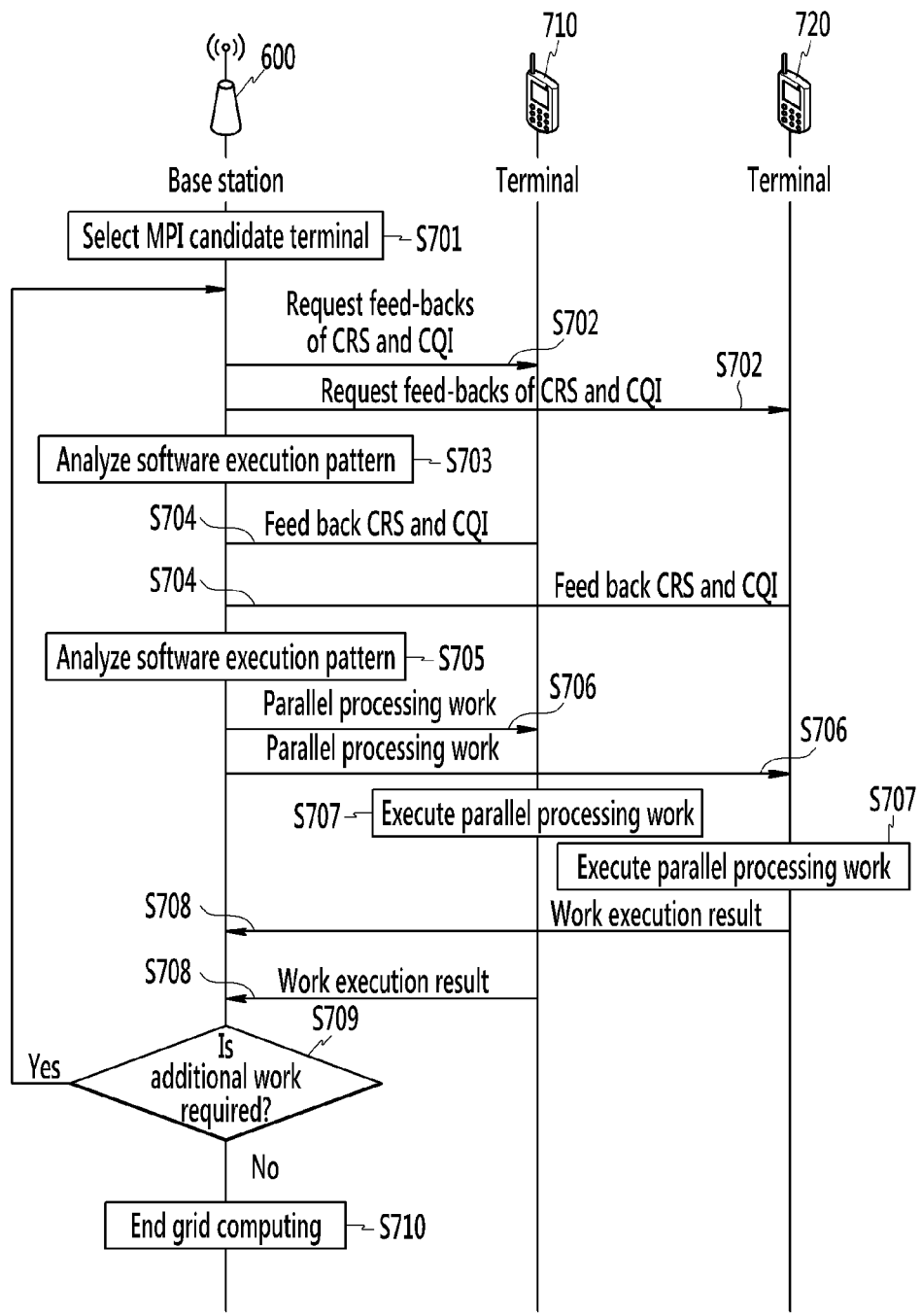
FIG. 7 is a flowchart illustrating another alternative exemplary embodiment of a grid computing method using a base station according to the invention.

FIG. 7 is a flowchart illustrating another alternative exemplary embodiment of a grid computing method using a base station according to the invention.

Referring to FIGS. 6 and 7, in an exemplary embodiment, the transmitting unit 610 requests the CRS feedback and the CQI feedback based on the list of the MPI candidate terminals initially selected by the MPI candidate terminal selecting unit 620 (S701 and S702). In such an embodiment, the software execution pattern analyzing unit 670 analyzes the execution pattern of the application to be executed by grid computing (S703). In such an embodiment, the software execution pattern analyzing unit 670 may analyze whether the application to use more message passing than computing resources or more computing resources than the message passing for the grid computing.

Thereafter, the receiving unit 630 of the base station 600 receives the CRS feedback and the CQI feedback from the MPI candidate terminal, and transfers the received CRS feedback and CQI feedback to the work execution terminal determining unit 640 (S704). The work execution terminal determining unit 640 determines at least one work execution terminal 710 and 720 based on the CRS feedback and the CQI feedback received from the MPI candidate terminal, and the analysis result of the software execution pattern analyzing unit 670 (S705). As described above, when it is determined that the application uses more message passing than the computing resources, based on the analysis result of the software execution pattern, the work execution terminal determining unit 640 may determine the work execution terminals 710 and 720 by giving the weighted value to the CQI of the MPI candidate terminal. In such an embodiment, when it is determined that the application uses more computing resources than the message passing, based on the analysis result of the software execution pattern, the work execution terminal determining unit 640 may determine the work execution terminals 710 and 720 by giving the weighted value to the CRS of the MPI candidate terminal. In such an embodiment, the work execution terminal determining unit 640 may consider an SPI of the base station 600.

Thereafter, the message generating unit 650 determines the parallel processing work to be allocated to one or more determined work execution terminals 710 and 720, respectively, and generates a work instruction for the determined parallel processing work to transmit the generated work instruction to each work execution terminal 710 or 720 (S706). Each of the work execution terminals 710 and 720 receiving the work instruction executes the allocated parallel processing work (S707) and transmits the execution result to the base station 600 (S708).

The base station 600 receives the execution result for the parallel processing work from each work execution terminal 710 and 720, and the control unit 660 of the base station 600 collects the result feedbacks to determine whether additional work is required (S709). When it is determined that the additional work is to be executed, the control unit 660 instructs the transmitting unit 610 to request the CRS feedback and the CQI feedback for the MPI candidate terminal. Thereafter, the transmitting unit 610 re-requests the CRS feedback and the CQI feedback from the MPI candidate terminal, and as a result, the additional work may be executed. When it is determined that the additional work is not to be executed, the base station 600 ends the wireless grid computing (S710).

The base station according to the exemplary embodiment of the invention may include at least one processor (not illustrated), a memory (not illustrated), and programs stored in the memory and executed by at least one processor. The programs included in the base station according to the exemplary embodiment of the invention may include a command regarding the selection of the MPI candidate terminals, a command to request the CRS and CQI feedback, a command associated with the determination of the work execution terminals, a command regarding distribution of the parallel processing work, and a function to determine the completion of the parallel processing work. At least one processor executes various programs or command sets stored in the memory to execute various functions for the base station and process data. The memory may include a high-speed RAM and may include at least one magnetic disk storage device, flash memory device, or non-volatile memory such as other SSD. Access to the memory by another component of the base station, such as at least one processor may be controlled by a memory controller (not illustrated).

According to exemplary embodiments of the invention, CRS and CQI information of each terminal are shared by a terminal or a base station that performs wireless grid computing in real time to provide efficient wireless grid computing. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless grid computing method based on a message passing interface using a base station, the method comprising:

receiving a feedback of a computing resource state and a feedback of channel quality information from a plurality of candidate terminals, by the base station;

analyzing an execution pattern of software to be executed by wireless grid computing, by the base station;

determining at least one work execution terminal to execute the wireless grid computing among the plurality of candidate terminals, by the base station, based on an analysis result of the execution pattern, the feedback of the computing resource state and the feedback of the channel quality information; and assigning parallel processing work for the wireless grid computing to the at least one work execution terminal, by the base station;

receiving the execution result of the parallel processing work from the at least one work execution terminal, by the base station;

collecting the execution result and determining whether additional work is to be executed based on the collected execution result, by the base station; and repeating the receiving the feedback of the computing resource state and the feedback of the channel quality information, the determining the at least one work execution terminal, the assigning, and the receiving the execution result when it is determined that the additional work is to be executed.

2. The method of claim 1, wherein the determining the at least one work execution terminal comprises considering spatial property information of the base station.

3. The method of claim 2, wherein the assigning comprises assigning the parallel processing work to the at least one work execution terminal by forming a beam based on the spatial property information to assign the parallel processing work.

4. The method of claim 1, further comprising:
requesting the feedback of the computing resource state and the feedback of the channel quality information from the plurality of candidate terminals by the base station.

5. The method of claim 4, wherein the requesting comprises selectively requesting the feedback of the computing resource state based on the type of the parallel processing work.

6. The method of claim 1, further comprising:
collecting hardware information and software information of a plurality of terminals, by the base station; and
selecting the plurality of candidate terminals among the plurality of terminals by the base station based on the hardware information and the software information.

7. The method of claim 1, wherein the determining the at least one work execution terminal comprises:
determining whether a message passing through a wireless link is to be used more than a computing resource of the at least one work execution terminal to execute the wireless grid computing; and
determining a candidate terminal having higher channel quality among the plurality of candidate terminals as the at least one work execution terminal when it is determined that the message passing through the wireless link is to be used more than the computing resource of the at least one work execution terminal.

8. The method of claim 1, wherein the determining the at least one work execution terminal comprises:
determining whether a computing resource of the at least one work execution terminal is to be used than a message passing through a wireless link to execute the wireless grid computing; and
determining a candidate terminal having a high computing resource among the plurality of candidate terminals as the at least one work execution terminal when it is determined that the computing resource of the at least one work execution terminal is to be used more than the message passing through the wireless link.

9. A base station for executing wireless grid computing based on a message passing interface, the base station comprising:
a receiving unit which receives a feedback of a computing resource state and a feedback of channel quality information from a plurality of candidate terminals;
a software execution pattern analyzing unit which analyzes an execution pattern of software to be executed by the wireless grid computing;
a work execution terminal determining unit which determines at least one work execution terminal to execute the wireless grid computing among the plurality of candidate terminals based on an analysis result of the execution pattern, the feedback of the computing resource state and the feedback of the channel quality information;
a message generating unit which generates an assignment message to assign parallel processing work of the wireless grid computing to the at least one work execution terminal; and
a control unit which receives an execution result of the parallel processing work from the at least one work execution terminal and collects the execution result to determine whether additional work is to be executed based on the collected execution result,
wherein the control unit instructs the receiving unit, the work execution terminal determining unit, the message generating unit, and the transmitting unit to perform operations thereof again when it is determined that the additional work is to be executed.

10. The base station of claim 9, wherein the work execution terminal determining unit considers spatial property information of the base station.

11. The base station of claim 10, further comprising:
a transmitting unit which transmits the assignment message by forming a beam based on the spatial property information.

12. The base station of claim 9, wherein the message generating unit generates a feedback request message to request the feedback of the computing resource state and the feedback of the channel quality information from the plurality of candidate terminals.

13. The base station of claim 12, wherein the feedback request message selectively includes a feedback request for the feedback of the computing resource state based on the type of the parallel processing work.

14. The base station of claim 9, wherein the receiving unit comprises a candidate terminal selecting unit which collects hardware information and software information of a plurality of terminals and selects the plurality of candidate terminals among the plurality of terminals based on the hardware information and the software information.

15. The base station of claim 9, wherein
the software execution pattern analyzing unit determines whether a message passing through a wireless link is to be used more than a computing resource of the at least one work execution terminal to execute the wireless grid computing, and
the work execution terminal determining unit determines a candidate terminal having a higher channel quality among the plurality of candidate terminals as the at least one work execution terminal when it is determined that the message passing through the wireless link is to be used more than the computing resource of the at least one work execution terminal.

16. The base station of claim 9, wherein
the software execution pattern analyzing unit determines whether a computing resource of the at least one work execution terminal is to be used more than a message passing through a wireless link to execute the wireless grid computing, and
the work execution terminal determining unit determines a terminal having a higher computing resource among the candidate terminals as the at least one work execution terminal when it is determined that the computing resource of the at least one work execution terminal is to be used more than the message passing through the wireless link.

17. A wireless grid computing method based on a message passing interface using a base station, the method comprising:
receiving a request for wireless grid computing from a terminal and relaying the request to at least one candidate terminal, by the base station;
receiving a feedback of a computing resource state and a feedback of channel quality information from the at least one candidate terminal, by the base station;
determining at least one work execution terminal to execute the wireless grid computing among the at least one candidate terminal, by the base station, based on the feedback of the computing resource state and the feedback of the channel quality information;
transferring a list of the at least one work execution terminals from the base station to the terminal;
receiving an execution result of the parallel processing work from the at least one work execution terminal and relaying the execution result to the terminal, by the base station; and
repeating the receiving the feedback of the computing resource state and the feedback of the channel quality information, the determining the at least one work execution terminal, and the receiving the execution result when it is determined that the additional work is to be executed based on the execution result.

18. The method of claim 17, wherein the request for the wireless grid computing comprises feedback requests for the feedback of the computing resource state and the feedback of the channel quality information.

19. The method of claim 17, further comprising:
receiving parallel processing work assigned based on the list of the at least one work execution terminals from the terminal and relaying the parallel processing work to the at least one work execution terminal, by the base station.

20. The method of claim 17, wherein the determining the at least one work execution terminal comprising considering spatial property information of the base station.

21. A wireless grid computing method based on a message passing interface using a terminal, the method comprising:
receiving a feedback of a computing resource state and a feedback of channel quality information from at least one candidate terminal, by the terminal;
analyzing an execution pattern of software to be executed by wireless grid computing, by the terminal;
determining at least one work execution terminal to execute the wireless grid computing among at least one candidate terminal based on an analysis result of the execution pattern, the feedback of the computing resource state and the feedback of the channel quality information, by the terminal;
assigning parallel processing work of the wireless grid computing to the at least one work execution terminal, by the terminal;
receiving the execution result of the parallel processing work from the at least one work execution terminal, by the terminal;
collecting the execution result and determining whether additional work is to be executed, by the terminal; and
repeating the receiving the feedback of the computing resource state and the feedback of the channel quality information, the determining the at least one work execution terminal, the assigning, and the receiving the execution result when it is determined that the additional work is to be executed.

22. The method of claim 21, wherein the determining the at least one work execution terminal comprises considering spatial property information of the terminal.

23. The method of claim 22, wherein the assigning comprises assigning the parallel processing work to the at least one work execution terminal by forming a beam based on the spatial property information.

24. The method of claim 21, further comprising:
collecting hardware information and software information of a plurality of terminals, by the terminal; and
selecting the at least one candidate terminal among the plurality of terminals based on the hardware information and the software information, by the terminal.

25. The method of claim 24, further comprising:
requesting the feedback of the computing resource state and the feedback of the channel quality information from the at least one candidate terminal, by the terminal.

26. The method of claim 25, wherein the requesting comprises selectively requesting the feedback of the computing resource state based on the type of the parallel processing work.

27. The method of claim 21, wherein the determining the at least one work execution terminal comprises:
determining whether a message passing through a wireless link is to be used more than a computing resource of the at least one work execution terminal to execute the wireless grid computing; and
determining the candidate terminal having a higher channel quality among the at least one candidate terminal as the at least one work execution terminal when it is determined that the message passing through the wireless link is to be used more than the computing resource of the at least one work execution terminal.

28. The method of claim 21, wherein the determining the at least one work execution terminal comprises:
determining whether a computing resource of the at least one work execution terminal is to be used more than a message passing through a wireless link to execute the wireless grid computing; and
determining a candidate terminal having a higher computing resource among the at least one candidate terminal as the at least one work execution terminal when it is determined that the computing resource of the at least one work execution terminal is to be used more than the message passing through the wireless link.

29. An apparatus for executing wireless grid computing based on a message passing interface, the apparatus comprising:
at least one processor;
a memory; and
at least one program stored in the memory and executed by the at least one processor, wherein the at least one program comprises:
- a command to receive a feedback of a computing resource state and a feedback of channel quality information from a plurality of candidate terminals,
- a command to analyze an execution pattern of software to be executed by the wireless grid computing,
- a command to determine at least one work execution terminal to execute the wireless grid computing among the plurality of candidate terminals based on an analysis result of the execution pattern, the feedback of the computing resource state and the feedback of the channel quality information,
- a command to assign parallel processing work of the wireless grid computing to the at least one work execution terminal,
- a command to receive the execution result of the parallel processing work from the at least one work execution terminal, by the base station,
- a command to collect the execution result and determine whether additional work is to be executed based on the collected execution result, by the base station, and
- a command to repeat the command to receive the feedback of the computing resource state and the feedback of the channel quality information, the command to determine the at least one work execution terminal, the command to assign, and the command to receive the execution result when it is determined that the additional work is to be executed based on the collected execution result.

* * * * *